United States Patent [19]

Narad

[11] Patent Number: 5,287,503
[45] Date of Patent: Feb. 15, 1994

[54] SYSTEM HAVING CONTROL REGISTERS COUPLED TO A BUS WHEREBY ADDRESSES ON THE BUS SELECT A CONTROL REGISTER AND A FUNCTION TO BE PERFORMED ON THE CONTROL REGISTER

[75] Inventor: Charles E. Narad, Santa Clara, Calif.

[73] Assignee: Sun Microsystems, Inc., Mountain View, Calif.

[21] Appl. No.: 767,122

[22] Filed: Sep. 27, 1991

[51] Int. Cl.[5] ............................................. G06F 12/00
[52] U.S. Cl. ................................ 395/425; 364/229.2; 364/247; 364/DIG. 1
[58] Field of Search .................. 395/600, 425; 364/DIG. 1

[56] References Cited

U.S. PATENT DOCUMENTS

| | | | |
|---|---|---|---|
| 4,085,106 | 2/1989 | Pfeifer | 364/200 |
| 4,086,658 | 4/1978 | Finlay | 364/900 |
| 4,149,264 | 4/1979 | Hamada et al. | 364/900 |
| 4,194,241 | 3/1980 | Mager | 395/375 |
| 4,520,439 | 5/1985 | Liepa | 395/425 |
| 4,663,728 | 5/1987 | Weatherford et al. | 395/425 |
| 4,862,155 | 8/1989 | Dalrymple et al. | 340/747 |
| 5,201,039 | 4/1993 | Sakamura | 395/375 |

Primary Examiner—Thomas C. Lee
Assistant Examiner—Paul Harrity
Attorney, Agent, or Firm—Blakely Sokoloff Taylor & Zafman

[57] ABSTRACT

A computer storage register architecture permitting secure atomic access to set or clear one or more particular bits wherein a multiple bit register is disclosed. In the preferred embodiment, a multiplicity of unique addresses is assigned to a multiple bit register. One address constitutes a read address, one address constitutes a clear address, and a third address constitutes a set address. An address decoder decodes the addresses assigned to the register so that only that register is accessed for the associated read, clear, and set operations, respectively. Data having a register position equivalent binary pattern of logical zeros and ones corresponding to particular bit locations of the register to be set or cleared are associated with the set and clear addresses. If the position equivalent binary value of the data associated with the address decoded is a logical one, then the corresponding bit in the register will be set or cleared. Otherwise, the bit remains unchanged.

26 Claims, 7 Drawing Sheets

Prior Art - Coherence Problem

*Prior Art Mutual Exclusion Lock*

ADDRESS DECODER TRUTH TABLE

| INPUTS | | | OUTPUTS | | |
|---|---|---|---|---|---|
| ADDRESS | READ ENABLE | WRITE ENABLE | SET | CLEAR | READ |
| ADDR0 | 1 | 0 | 0 | 0 | 1 |
| ADDR4 | 0 | 1 | 0 | 1 | 0 |
| ADDR8 | 0 | 1 | 1 | 0 | 0 |
| ALL OTHER COMBINATIONS | | | 0 | 0 | 0 |

*Figure 3a*

FLIP-FLOP TRUTH TABLE

| INPUTS | | | OUTPUTS |
|---|---|---|---|
| SELECT | SET | CLEAR | Q |
| 0 | X | X | NO CHANGE |
| 1 | 0 | 0 | NO CHANGE |
| 1 | 0 | 1 | 0 |
| 1 | 1 | 0 | 1 |
| 1 | 1 | 1 | NOT PERMITTED |

*Figure 3b*

| ADDRESS | DATA | | ACTION | REGISTER CONTENTS |
|---|---|---|---|---|
| | HEX | BINARY EQUIVALENT | | |
| | | | | XXXX * |
| ADDR4 | F | 1111 | Write - to - CLEAR | 0000 |
| ADDR8 | 8 | 1000 | Write - to - SET | 1000 |
| ADDR8 | 2 | 0010 | Write - to - SET | 1010 |
| ADDR0 | -- | -- | READ | 1010 |
| ADDR4 | 8 | 1000 | Write - to - CLEAR | 0010 |
| ADDR4 | -- | -- | READ | 0010 |

\* Indicates data is either a "1" or "0"

*Figure 4*

SYSTEM HAVING CONTROL REGISTERS COUPLED TO A BUS WHEREBY ADDRESSES ON THE BUS SELECT A CONTROL REGISTER AND A FUNCTION TO BE PERFORMED ON THE CONTROL REGISTER

RELATED APPLICATIONS

The present invention is related to the following co-pending applications: Ser. No. 07/766,784, entitled "A Bus-To-Bus Interface For Preventing Data Incoherence in a Multiple Processor Computer System", still pending; Ser. No. 07/766,834, entitled "Methods and Apparatus for Locking Arbitration on a Remote Bus", still pending; Ser. No. 07/767,023, entitled "Method and Apparatus For Dynamically Steering Undirected Interrupts", still pending; and Ser. No. 07/766,835, entitled "A Bus Arbitration Architecture Incorporating Deadlock Detection and Masking", still pending.

BACKGROUND OF THE INVENTION

1. Field of the Invention

The present invention relates generally to computer system hardware. More particularly, the present invention relates to a hardware architecture for control and status registers within a computer system processor.

2. Art Background

Computer systems frequently make use of registers for temporary storage of data or for control purposes. Registers are commonly constructed so that multiple bits of information may be stored at the same time, typically ranging from one to four bytes. Data in the form of logical zeros and ones generated by the computer's processor may be stored in the register, and then subsequently re-read by the processor. In controlling a computer's operation, operating systems frequently require that a single bit, within a collection of bits stored in a multiple bit register, be altered without affecting the remaining bits. In such a case, the operating system will execute a read-modify-write cycle, whereby the CPU reads information contained in the storage register, then modifies the contents and subsequently writes the modified contents back into the register. The read-modify-write operation, permits the processor to set or clear bits of a particular control parameter as needed in subsequent data processing or computing operations.

Execution of a read-modify-write cycle is commonly used in single processor systems. However, in a multiple processor environment where more than one master device has equal opportunity to access a register, there exists a substantial likelihood that one master will overwrite, modify, alter, or otherwise interfere with the contents of the register previously stored by another master device. Referring briefly to FIG. 1, two processors sharing a storage register are shown, wherein both processors are concurrently performing read-modify-write cycles upon a single register. From FIG. 1, it is seen that when Master B completes its final write operation, Master B will have nullified Master A's write operation. A crucial requirement of multiple processor systems is that information stored by a particular master is not subsequently undone by another master. The condition of the contents of a particular register, being consistent with the master device causing such contents to be stored in that register, is known as "coherence". Coherence in a multiple processor environment where more than one master has the opportunity to modify information stored in a register is of concern primarily in the context of cache memory architectures. In a multiple processor architecture incorporating cache memories, cache consistency with respect to a particular master is of paramount concern.

In the prior art, a predominant method of preventing cache coherence problems is to invoke a so called "mutual exclusion lock", as shown in FIG. 1a. A mutual exclusion lock is a semaphore where, in software, a particular master obtains, prior to accessing a particular register, ownership of a signal or flag which permits the accessing master, and only that accessing master, to engage and control that register. A mutual exclusion lock is typically invoked by a master executing an exchange operation with a hardware register comprising the flag. The master reads the contents of the flag register and thereafter loads some non-zero value into the register, where both read and write operations are performed such that no other master can read or write to that register during the pendency of the exchange operation. The master then tests the value of the contents read from the register during the exchange: if the register contents equal "0", then the lock was "free", and may now be claimed by the master; if the register contents equal some non-zero value then the lock is "not free", and the master is denied use of that lock. The master would typically continue to perform exchange and test operations until the tested value was "0", indicating the lock is "free". A lock is released by the master having control of the lock writing a "0" into the flag register. For example, as shown in FIG. 1a, the lock is set when a master executes an exchange operation, the master storing some non-zero value <lock_busy>. The master then tests the value of the contents previously stored in the lock register against a reference value <lock_free> to see if the lock was "free". If the previously stored contents equals <lock_free>, the master will determine it is the owner of the lock.

Controlling the mutual exclusion lock permits a processor to access and store information in a register without concern that information stored will be later corrupted due to an unexpected access by another processor. Furthermore, only the masters which claimed the lock by setting the flag can release the lock by clearing the flag. Mutual exclusion locks are well known in the prior art, and several software algorithms exist which produce the lock function. In multiple processor systems, there exist many such mutual exclusion locks and the operating system software uses such locks frequently to indicate when critical code is being executed, or when critical registers are being accessed. However, the use of mutual exclusive locks requires significant additional processing time as well as additional code space in order to effect the lock function. In speed critical computation, use of multiple locks can substantially hamper or otherwise diminish system performance.

As will be discussed below, the present invention discloses a simple register architecture which ensures coherence between masters and data stored in system storage registers in a multiple processor environment, without the need for time intensive software interlock mechanisms provided in the prior art. Furthermore, the present invention permits one or more individual bits of a shared register to be accessed and modified directly and simultaneously without requiring software interlocks as in the prior art.

SUMMARY OF THE INVENTION

The present invention provides methods and apparatus for a register structure within a multiple processor environment, wherein a processor can atomically access a shared register in order to set or clear one or more particular bits within the register without software interlocks, while preventing unintentional access of the atomic access register by the wrong master. A multiplicity of unique addresses is assigned to a multiple bit atomic access register. In the preferred embodiment, three addresses are assigned to each physical atomic access register. One address constitutes a clear address, a second address constitutes a set address, while the third address constitutes a read address. Each address is distinct from every other address. An address decoder decodes the addresses assigned to each atomic access register when a processor issues any register access instruction. When decoded by the address decoder, each address points to the same physical register, two of the addresses pointing to "pseudo-registers". Data having a position-equivalent binary pattern of logical zeros and ones corresponding to particular bit locations of the physical register to be set or cleared are associated with the set and clear addresses respectively. No data is associated with the read address. Each bit within the atomic access register is formed of a flip-flop having set, clear, select, and system clock inputs, and an output enable. The select input for a particular flip-flop is activated according to the position-equivalent binary data associated with the address decoded. If data corresponding to a particular bit which is to be altered is a logical 1, the flip-flop comprising that data bit within the register is selected. Once selected, the bit will either be set or cleared, depending whether the address associated with the register containing the selected bit constitutes the set or clear function, respectively. The remaining bits of the accessed physical register are similarly altered in accordance with the remaining position equivalent binary data associated with the address accessing the corresponding pseudo-register. Output enable for each flip-flop of the register delivers the contents of each bit of the register to the accessing processor when the address issued is the read address.

BRIEF DESCRIPTION OF THE DRAWINGS

The objects, features, and advantages of the present invention will be apparent in the following detailed description in which:

FIG. 3a is a logic table for the address decoder used in the preferred embodiment of the present invention.

FIG. 3b is a logic table for the flip-flops comprising the atomic access register.

FIG. 4 illustrates examples of atomic access to a register for read and write operations.

DETAILED DESCRIPTION OF THE INVENTION

A register architecture is disclosed wherein each processor in a multiple processor computer system may atomically access a shared register to set or clear one or more particular bits without need for software interlocks. In the following description, for purposes of explanation, specific numbers, times, signals etc., are set forth in order to provide a thorough understanding of the present invention. However, it will be apparent to one skilled in the art that the present invention may be practised without these specific details. In other instances, well known circuit and devices are shown in block diagram form in order not to obscure the present invention unnecessarily.

The present invention may be practiced in many embodiments. Two specific embodiments will be discussed in detail below, although it will be appreciated that many alternative embodiments will produce the same result. It is anticipated that storage register architectures incorporating the teachings of the present invention may be implemented anywhere within a computer system. As presently preferred, registers allowing atomic access to set and clear bits are implemented within an interrupt steering architecture. Although the present invention may be used with any multiple processor computer system, it is intended to function with the multiple processor computers manufactured by Sun Microsystems, Inc., Mountain View, Calif. The present invention described below is intended to function in connection with the previously cited co-pending applications and in particular co-pending application Ser. No. 07/767,023, entitled "Method and Apparatus for Dynamically Steering Undirected Interrupts".

Figure 1:
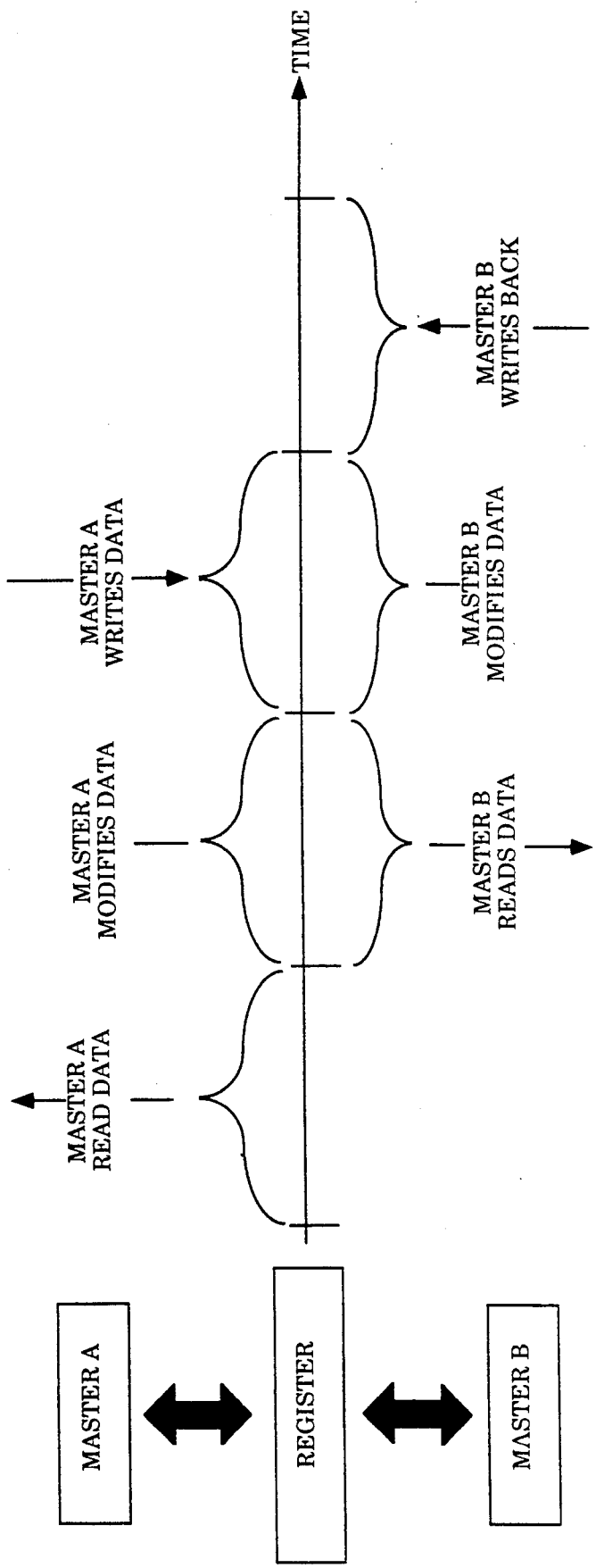
FIG. 1 illustrates the coherence problem encountered in the prior art where a multiple master environment may cause overwrite or unintended modification of a register.
Figure 1A:
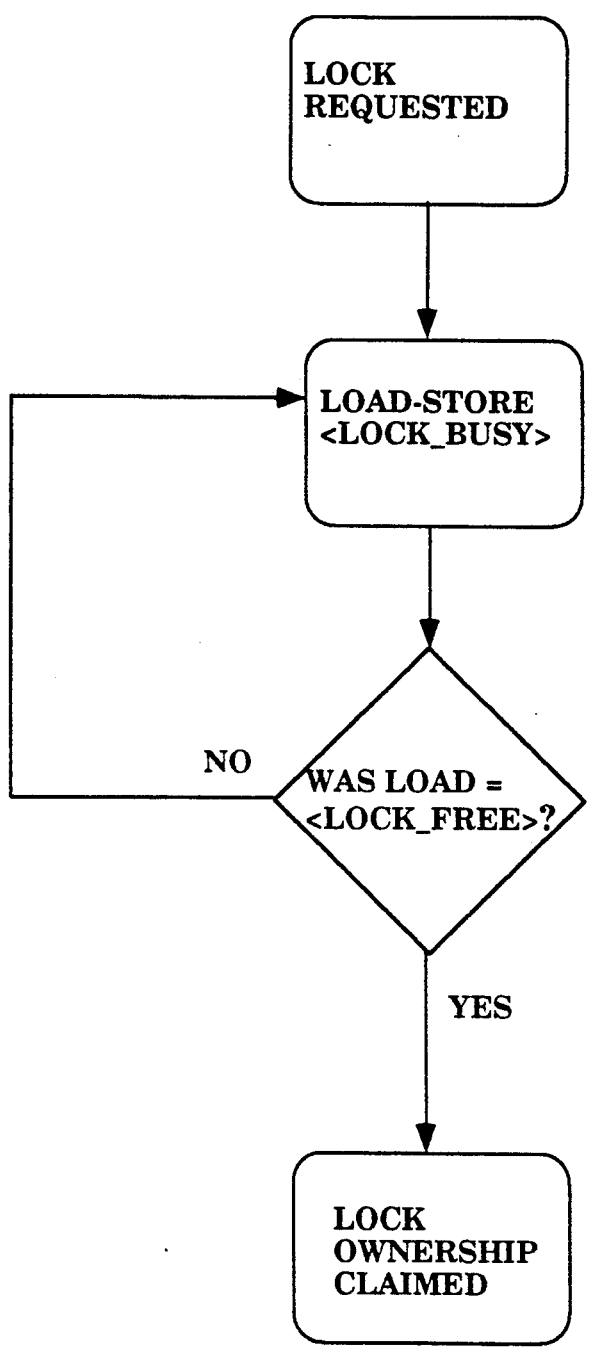
FIG. 1a is a prior art solution to the coherence problem illustrated in FIG. 1, wherein a software mutual exclusion lock prevents access by a master to a particular register the pending access by another master.
Figure 2:
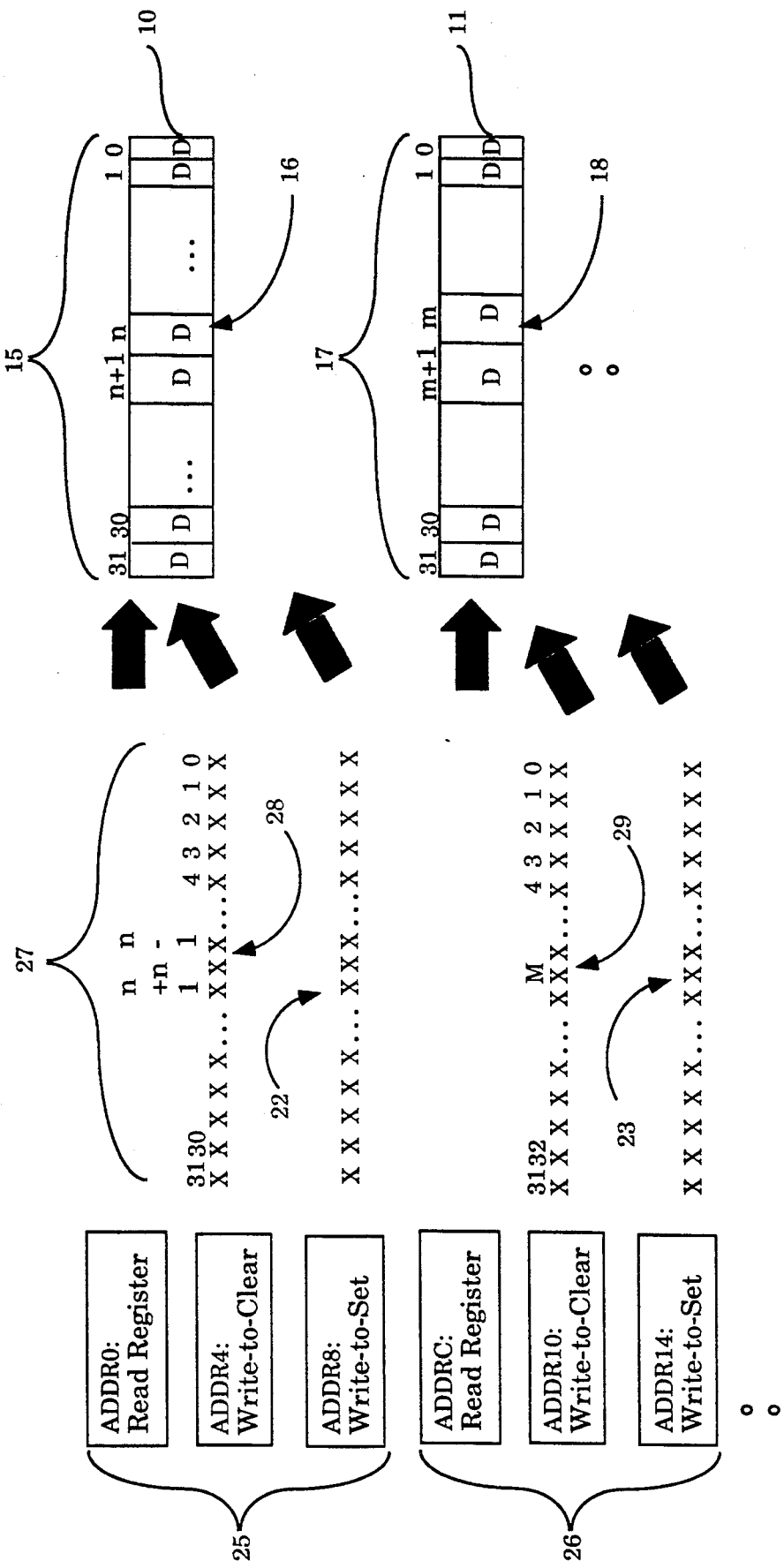
FIG. 2 illustrates the preferred embodiment of the present invention where three separate addresses are assigned to each physical atomic access register, with each address carrying an associated bit mask.

Referring now to FIG. 2, a block diagram representation of two atomic access registers is shown. However, any number of atomic access registers may be implemented in a particular multiple processor computer system design. In FIG. 2, a multiple bit register 10 is formed in a known manner. Register 10 is formed of a multiplicity of individual bits 15. There is no practical limitation as to the number of bits 15 contained within register 10, register 10 typically containing as many bits as may be accommodated by the computer system bus (not shown). In the preferred embodiment, register 10 is 32 bits wide. Associated with register 10 are multiple addresses 25. As shown in FIG. 2, individual addresses, ADDR0, ADDR4, and ADDR8 all point to register 10. When executed by a processor (not shown) and decoded by an address decoder (not shown), addresses 25 permit the processor to access register 10. The processor and address decoder are formed as is generally known in the art. It is important to note that depending which of addresses 25 is executed by a processor, the action upon register 10 will vary. Specification of register 10 also depends upon how the decoder is implemented. Although certain address values have been assigned to addresses 25 for purposes of explanation, the reader will appreciate that any address value will function within the present invention, provided each address is unique, decodeable, and consistent with the overall system architecture.

Action upon individual bits 15 comprising register 10 is controlled by data 27 associated with each of the addresses 25 when an address instruction is executed by the processor. In particular, an individual bit 16 within register 10 may be represented by a position-equivalent bit 28 in a binary representation of the data 27 associated with the particular address 25 in the address instruction executed by the accessing processor. That is, the position-equivalent bit 28 location in a binary data equivalent of the data 27 associated with the particular address 25 being executed will control whether the physical bit 16 within register 10 is acted upon. The operation of addresses 25 in conjunction with associated data 27 in controlling individual bits 15 within register 10 will be explained in more detail in the following paragraphs.

Still referring to FIG. 2, the address 25 assigned to perform a READ operation on register 10 is ADDR0. When executed by a processor and decoded by the address decoder, ADDR0 points to register 10 and the processor will read the data for all bits 15 contained within register 10. There is no data 27 associated with address 25 when address 25 is assigned to perform a READ because no bits 15 within register 10 will be altered during the READ operation. The address assigned to perform a CLEAR operation is ADDR4. When executed by a processor and decoded, ADDR4 will also point to register 10. However, unlike the ADDR0 address associated with the READ operation, the ADDR4 address has associated with it data 27 masking bits 15 which are to be cleared. The processor will then clear a particular bit 15 of register 10 according to the position-equivalent bit 28 of the binary equivalent of data 27 associated with address ADDR4. If the position-equivalent data bit 28 is a logical 1, the bit 16 corresponding to data bit 28 will be set to a logical 0. The bit 16 will remain unchanged if the position-equivalent data bit 28 is a logical 0. Finally, the address 25 assigned to perform a SET operation is ADDR8. When executed by the processor and decoded, ADDR8 will also point to register 10. As in the case of ADDR4 above, data 27 is associated with address ADDR8. The processor will set each bit 16 of register 10 according to the position-equivalent bit 22 of the binary equivalent of data 27 associated with address ADDR8. If the position-equivalent bit 22 is a logical 1, the bit 16 corresponding to position-equivalent bit 22 will be set to a logical 1. The bit 16 remains unchanged if the position-equivalent bit 22 is a logical 0.

Action upon individual bits 17 comprising register 11 is controlled by data 27 associated with each of the addresses 26 when the address instruction is executed by the processor. In particular an individual bit 18 within register 11 may be represented by a position-equivalent bit 29 in a binary representation of the data 27 associated with the particular address 26 executed by the accessing processor and pointing to register 11. That is, the position-equivalent bit 29 location in a binary data equivalent of the data 27 associated with the particular address 26 being executed will control whether the physical bit 18 within register 11 is acted upon. The operation of the addresses 26 in conjunction with associated data 27 in controlling individual bits 17 within register 11 will be explained in more detail below.

Still referring to FIG. 2, the address 26 assigned to perform a READ operation on register 11 is ADDRC. When executed by a processor and decoded by the address decoder, ADDRC points to register 11 and the processor will read the data for all bits 17 contained within register 11. There is no data 27 associated with address 26 when address 26 is assigned to perform a READ because no bits 17 within register 11 will be altered during the READ operation. The address assigned to perform a CLEAR operation is ADDR10. When executed by a processor and decoded, ADDR10 will also point to register 11. However, unlike the ADDRC address associated with the READ operation, the ADDR10 address has associated with it data 27 masking the bits 17 which are to be cleared. The processor will then clear a particular bit 17 of register 11 according to the position-equivalent bit 29 of the binary equivalent of data 27 associated with address ADDR10. If the position-equivalent data bit 29 is a logical 1, the bit 18 corresponding to data bit 29 will be set to a logical 0. The bit 17 will remain unchanged if the position-equivalent data bit 29 is a logical 0. Finally, the address 26 assigned to perform a SET operation is ADDR14. When executed by the processor and decoded, ADDR14 will point to register 11. As in the case of ADDR10 above, data 27 is associated with address ADDR14. The processor will set each bit 18 of register 11 according to the position-equivalent bit 23 of the binary equivalent of data 27 associated with address ADDR14. If the position-equivalent bit 23 is a logical 1, the bit 18 corresponding to data bit 23 will be set to a logical 1. The bit 18 remains unchanged if the position-equivalent bit 23 is a logical 0.

Figure 3:
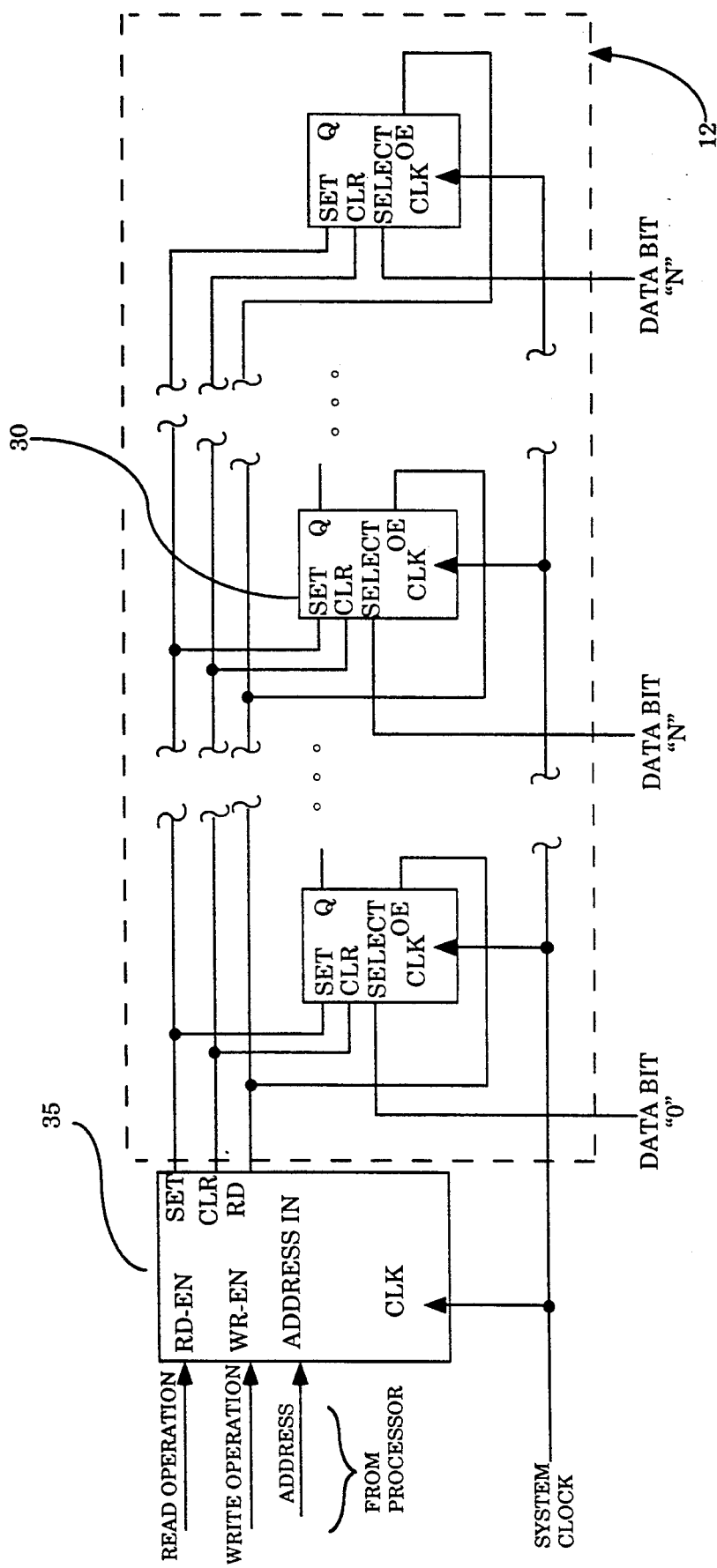
FIG. 3 illustrates the set clear and read address select lines for flip-flops within an atomic access register.

With reference now to FIG. 3, a block diagram representation of the implementation of an N-bit atomic access register 12 is shown. In FIG. 3, a flip-flop 30 stores the "nth" bit of register 12. Flip-flop 30 has four inputs: SET, CLEAR, SELECT, and CLOCK. Associated with register 12 is an address decoder 35. Address decoder 35 is a hardware decoder of known design and implemented in a known manner, having appropriate inputs for address lines, as well as READ ENABLE and WRITE ENABLE inputs to receive signals indicating that a valid READ or WRITE operation is ongoing. Address decoder 35 has two outputs, SET and CLEAR, respectively connected to the SET and CLEAR inputs of flip-flop 30, and to the SET and CLEAR inputs of each flip-flop comprising register 12. The READ output of address decoder 35 is connected to the OUTPUT ENABLE input of flip-flop 30 and of all flip-flops comprising register 12. OUTPUT ENABLE is asserted during an address cycle associated with register 12 and in the presence of an appropriate signal from the processor (not shown) indicating a READ operation is occurring.

As shown in FIGS. 2 and 3, the SELECT input for flip-flop 30 is derived from data 27 associated with address 25, and in particular from the position-equivalent binary representation of data 27 associated with flip-flop 30. The CLOCK inputs for flip-flop 30 and for address decoder 35 are taken from a SYSTEM CLOCK signal distributed throughout the computer.

In operation, whenever address decoder 35 determines that any address appearing on the address lines corresponds to register 12 controlled by address decoder 35, address decoder 35 will set, clear, or read individual bits 0 through N as determined by data 27 associated with address 25. With particular application to register 12 illustrated in FIG. 3, flip-flop 30 is cleared or set when the SELECT input to flip-flop 30 is activated by an "nth" position-equivalent binary bits 28 and 22 in data 27 associated with the decoded addresses ADDR4 and ADDR8, respectively, as shown in FIG. 2. All bits 0 through N are read when a READ instruction is issued together with address ADDR0.

As explained in the preceding paragraphs, the set/clear atomic access architecture disclosed by the present invention essentially implements a "pseudo-register" function for any register constructed according to the teachings thereof. Recall that pseudo-register generally refers to a hypothetical non-physical storage location. The pseudo-register may be identified by an address other than the address assigned to the physical register which actually stores the subject data. Thus, although only one physical register exists in hardware, the physical register may be identified by a multiplicity of addresses permitting a multiplicity of functions to be performed on the register.

A specific example of addresses and associated data controlling the reading, setting, and clearing of register bits will now be described in connection with FIG. 4. In FIG. 4, addresses and data associated with read and write commands are shown. Also shown in FIG. 4 are the final register contents for a particular register (not shown) pointed to by an address. For purposes of illustration in FIG. 4, the register is assumed to be a 4 bit register. In FIG. 4, the binary data comprising the contents of the 4-bit register is initially an arbitrary combination of ones and zeros. Assume it is initially desired to clear all bit locations within the register. To clear the bits of the register, the operating system will write to the register, using the address assigned for the write-to-clear operation as discussed above in connection with FIG. 2, namely ADDR4. In accordance with the invention associating specific bit locations in a physical register with equivalent bit locations in a binary data value, a particular bit is selected when the position-equivalent bit in the binary representation is set to a logical 1. Thus, in order to clear all bit locations within the register, all 4 bit locations need to be selected. To select all 4 bits, all four position-equivalent binary bits in the data representation must be set to logical 1. For a 4 bit register, the binary data representation will be "1111". Binary 1111 is equivalent to F in hexadecimal data notation. Thus, in order to clear all bit locations within a 4 bit register, the composite instruction to be executed by controlling processor will be WRT ADDR4 FH.

Assume the next operation to be performed will set a particular bit within the register. Assume further that the bit to be set is the most significant bit. In order to set the most significant bit in the register, a binary representation of "1000" will be required. Also from FIG. 2 and the discussion above, the address associated with a set command is address ADDR8. Thus, in setting the most significant bit of the register, the composite instruction will be WRT ADDR8 8H. Further, assume that the next operation will be to set the second least significant bit in the register. Again the address to set will be ADDR8. Data associated with address ADDR8, setting the second least significant bit will be the data equivalent of "0010", or 2H. Thus the composite instruction setting the second least significant bit in the register will be WRT ADDR8 2H. Assume now that the register contents are to be read. The READ address from the discussion above as shown in FIG. 2 is address ADDR0. Notably, no data is associated with the read command because the operating system expects to receive data from the register being read. Thus, the instruction for reading the register is RD ADDR0. Upon execution of the read command, the register contents will appear at the read inputs of the processor requesting the read. Next, assume that the most significant bit is to be cleared. Accordingly, the write-to-clear address ADDR4, selecting the most significant bit is executed. The most significant bit is achieved by writing data which selects the fourth bit location: binary 1000. Accordingly, the composite instruction clearing the most significant bit will be WRT ADDR4 8H. Finally, it is desired to again read the contents of the register. As above, the read command requires no data associated with the address ADDR0. Thus, the composite instruction would be RD ADDR0. For each instruction executed according to the above example, FIG. 4 shows the final contents of the register, following completion of the respective operation steps.

As illustrated in the preceding paragraphs, the predominant attribute of the present invention is that unintended access to a register by an unintended processor is avoided during multistep instruction cycles. Accordingly, coherence of data between a processor and data stored by such processor in a register shared by multiple processors in a multiple processor computer system is preserved. Functionally, choosing one of the addresses 25 and 26 pointing to physical registers 10 and 11 determines the action within registers 10 and 11, respectively. That is, because all addresses 25 associated with register 10 operate only upon register 10, coherence of data stored in register 10 on behalf of a particular processor is ensured. Register 10 will only be accessed by a processor executing addresses which, when decoded, connect the processor to register 10, and no other. Uniqueness of function is analogously obtained in register 11 by addresses 26. Thus, unique register addresses provide ample selection of registers which may be accessed by multiple processors while avoiding coherence problems encountered in the prior art.

Another significant attribute of the present invention is that individual bits within a register may be set or cleared atomically, without the need for a multistep read-modify-write cycle. The present invention uses individual bits of a position equivalent binary data pattern as a mask for the actual bits of the physical register which will be set or cleared. The need for cumbersome code space and time intensive software interlock schemes to preserve data coherence between a master and data stored by the master are thereby obviated.

A reader skilled in the art will appreciate that a READ instruction can be implemented using either the write-to-set address, or write-to-clear address together with an appropriate READ ENABLE signal issued by the processor. The choice whether to use three separate addresses as in the first embodiment, or to read using either of the write addresses is entirely at the designer's discretion. In older first generation (e.g., 4-bit) processors, address space was limited and so every address of great value. In modern 32-bit and larger processors, address space is generally assigned to devices in blocks which far exceed the number of discrete addresses reasonably anticipated will be needed. Thus, the decision whether to construct a two-address atomic access register or a three-address atomic address register is simply a matter of designer preference. Choosing the three-address implementation over the two-address implementation will, of course, dictate the address decoder design.

Figure 5:
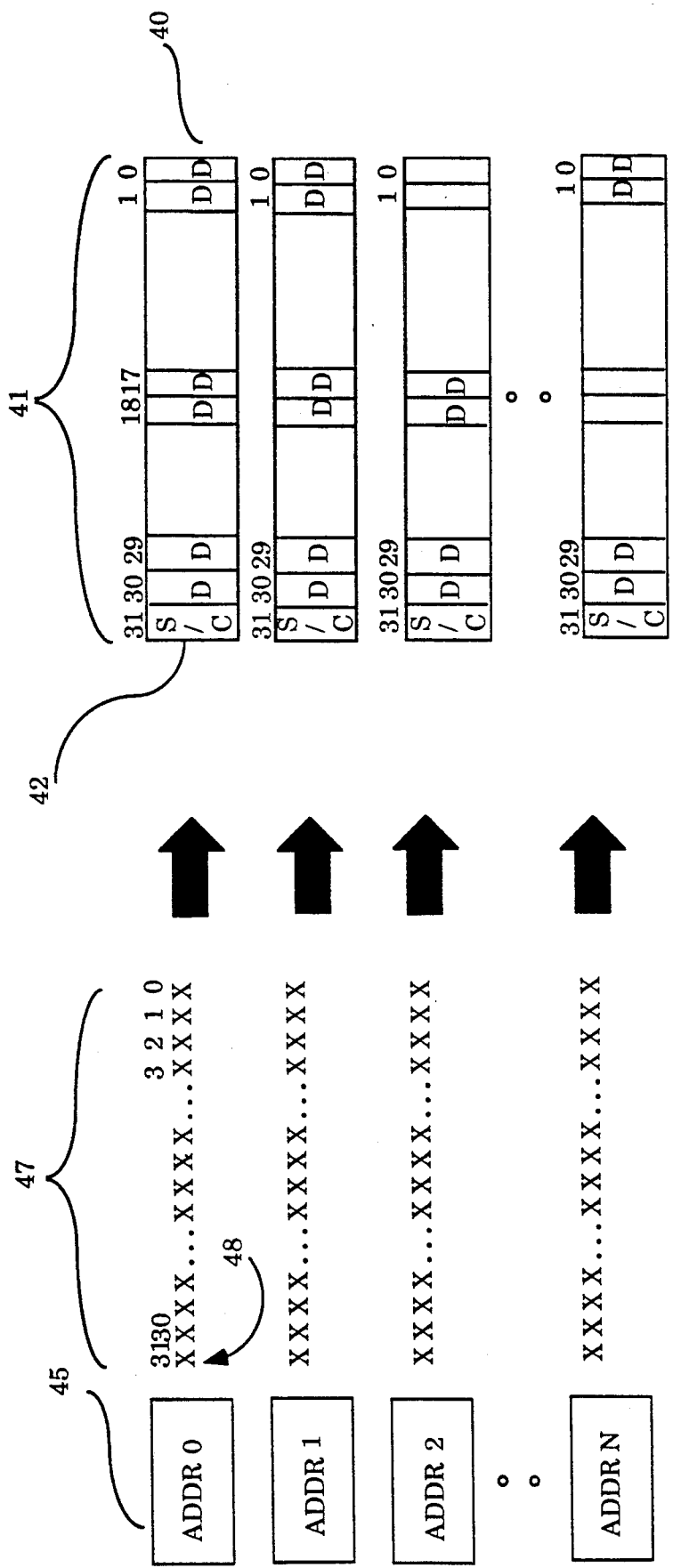
FIG. 5 illustrates a second alternative embodiment of the present invention wherein a single address is assigned to each physical atomic access register, but where the atomic function is controlled by a single bit of an associated bit mask.

Referring now to FIG. 5, a second alternative embodiment of the present invention of atomic access to a register is shown. In FIG. 5, register 40 is a multiple bit register constructed as discussed above. A single address 45 points to register 40 only. Associated with address 45 is data 47 whose binary equivalent provides a mask to set or clear individual bits 41 within register 40. In this second alternative embodiment, a single bit 42 of register 40 is designated as a flag to indicate whether the operation is a SET or CLEAR instruction. The bit performing this flag function may be any bit contained within register 40. Remaining bits store data in the usual manner. As is shown in FIG. 5, in the second embodiment the most significant bit 42 is used as the flag, wherein 1 indicates the operation will set bits and 0 will clear bits. Accordingly, implementation of an atomic access register according to this second alternative embodiment results in setting or clearing one fewer bits than in the previous embodiment. That is, in an atomic access register formed of N bits, the second embodiment will set or clear N-1 bits of the register, whereas the atomic access register of the first or second embodiments will set or clear N bits.

A write command to register 40 with most significant bit 48 of the binary equivalent of data 47 associated with the address instruction equal to logical 1 would cause the remaining bits of the binary equivalent of data 47 to be interpreted as a bit mask for setting individual bits 41 contained in register 40. If on the other hand, the most significant bit 42 of the binary equivalent of data 47 issued with the write instruction is logical 0, then the remaining bits of the binary equivalent would be interpreted as a bit mask for clearing the individual bits of register 40. In the second embodiment, the state of most significant bit 42 is meaningless in READ operations.

The foregoing has described two embodiments of a register which may be accessed atomically to set or clear individual bits within the register. It is contemplated that changes and modifications may be made by one of ordinary skill in the art to materials and arrangement of elements in the present invention without departing from the spirit and scope of the invention.

I claim:

1. In a computer system having a multiplicity of processors coupled to a bus, an atomic access control register system comprising:

register means comprising a plurality of control registers coupled to said bus for storing a plurality of bits, wherein a plurality of functions may be performed on each one of said control registers, each of said control registers identified by a plurality of addresses, each one of said plurality of addresses selecting a particular control register and a particular function to be performed upon said particular control register;

address means coupled to said bus and to said register means for accessing said bits stored in said control registers;

said address means receiving an address instruction issued by a particular processor, said address instruction comprising one of said addresses and a data value;

said address means connecting said particular processor to a particular control register, said address means accessing only particular bits of said particular control register and enabling a particular function on said particular bits, wherein said particular control register and said particular function are determined according to said one of said addresses, and said particular bits of said particular control register are determined according to said data value contained in said address instruction.

2. The atomic access control register system as set forth in claim 1, wherein said address means further comprises address decoding means for decoding said plurality of addresses corresponding to each of said control registers.

3. The atomic access control register system as set forth in claim 1, wherein said data value comprises a bit mask.

4. The atomic access control register system as set forth in claim 1, wherein said particular bits of said particular control register may be set.

5. The atomic access control register system as set forth in claim 1, wherein said particular bits of said particular control register may be cleared.

6. The atomic access control register system as set forth in claim 1, wherein each one of said plurality of addresses is unique.

7. The atomic access control register system as set forth in claim 1, wherein each one of said plurality of addresses points to a single physical control register.

8. The atomic access control register system as set forth in claim 7, wherein each of said plurality of addresses corresponds to a unique function upon said single physical control register.

9. In a computer system having a multiplicity of processors coupled to a bus, an atomic access control register system comprising:

register means comprising a plurality of control registers coupled to said bus for storing digital data, each of said control registers having a plurality of storage locations and storing a plurality of bits, wherein a plurality of functions may be performed on each one of said control registers, each of said control registers further identified by a plurality of addresses, each one of said plurality of addresses selecting a particular control register and a particular function to be performed upon said particular control register;

address means including address decoding means coupled to said bus and to said register means for accessing said bits stored in said control registers;

said address means receiving an address instruction when issued by a particular processor, said address instruction comprising one of said plurality of addresses and a data value having a storage location equivalent binary data representation, said storage location equivalent binary data representation comprising a bit mask;

said address decoding means decoding said one of said plurality of addresses and connecting said particular processor to a particular control register according to said one of said plurality of addresses;

said address means accessing only particular bits of said particular control register and performing said particular function on said particular bits, wherein said particular function is determined according to said one of said plurality of addresses, and wherein said particular bits are determined according to the bit mask formed by said storage location equivalent binary data respresentation of the data value contained in the address instruction.

10. The atomic access control register system as set forth in claim 9, wherein said particular bits of said storage locations of the particular control register may be set.

11. The atomic access control register system as set forth in claim 9, wherein said particular bits of said storage locations of the particular control register may be cleared.

12. The atomic access control register system as set forth in claim 9, wherein each one of said plurality of addresses is unique.

13. The atomic access control register system as set forth in claim 9, wherein said address decoding means decodes each of said plurality of addresses.

14. The atomic access control register system as set forth in claim 9, wherein each one of said plurality of addresses points to a single physical control register.

15. The atomic access control register system as set forth in claim 14, wherein decoding each of said plurality of addresses produces a unique function upon said single physical control register.

16. In a computer system having a multiplicity of processors coupled to a bus, a method of atomic access register control comprising the steps of:
providing register means comprising a plurality of control registers for storing a plurality of bits, wherein a plurality of functions may be performed upon each one of said control registers;
identifying each of said control registers by a plurality of addresses, each one of said plurality of addresses for selecting a particular control register and a particular function to be performed upon said particular control register;
providing address means for accessing said bits stored in said control registers;
providing further an address instruction comprising one of said addresses and a data value; and
using said address means, connecting a particular processor to a particular control register and performing a particular function on only particular bits of the particular control register, wherein said particular register and said particular function are determined according to said address and said particular bits are determined according to the data value contained in the address instruction.

17. The method of atomic access register control as set forth in claim 16, wherein providing said address means further comprises decoding said plurality of addresses corresponding to each of said control registers.

18. The method of atomic access register control as set forth in claim 16, wherein said data value comprises a bit mask.

19. The method of atomic access register control as set forth in claim 18, wherein said particular bits of said particular control register may be set.

20. The method of atomic access register control as set forth in claim 18, wherein said particular bits of said particular control register may be cleared.

21. The method of atomic access register control as set forth in claim 16, wherein each one of said plurality of addresses is unique.

22. The method of atomic access register control as set forth in claim 16, wherein each one of said plurality of addresses corresponds to a single physical control register.

23. The method of atomic access register control as set forth in claim 22, wherein each of said plurality of addresses represents a unique function upon said single physical control register.

24. The method of atomic access register control as set forth in claim 16, wherein action upon single control register is determined according to the value of one bit of said storage location equivalent binary data representation of the data value contained in the address instruction.

25. The method of atomic access register control as set forth in claim 24, wherein bits of said single control register may be cleared.

26. The method of atomic access register control as set forth in claim 16, wherein bits of said single control register may be set.

* * * * *